United States Patent [19]

Lunt et al.

[11] Patent Number: 5,043,392

[45] Date of Patent: Aug. 27, 1991

[54] TOUGHENED THERMOPLASTICS

[75] Inventors: James Lunt, Bright's Grove; Susan A. M. May, Sarnia; Patricia A. Leivo, Wyoming, all of Canada

[73] Assignee: Polysar Limited, Sarnia, Canada

[21] Appl. No.: 468,092

[22] Filed: Jan. 22, 1990

Related U.S. Application Data

[62] Division of Ser. No. 340,284, Apr. 19, 1989, Pat. No. 4,921,910.

[51] Int. Cl.$^5$ .................. C08F 8/32; C08F 236/08; C08F 210/12; C08K 5/17

[52] U.S. Cl. .................. 525/293; 525/332.3; 525/332.8; 525/380; 525/382; 525/194; 525/193; 525/74; 524/525

[58] Field of Search .................. 525/293, 332.3, 332.8, 525/380, 382

[56] References Cited

U.S. PATENT DOCUMENTS

| | | | |
|---|---|---|---|
| 2,395,493 | 2/1946 | Miller | 525/380 |
| 2,670,342 | 2/1954 | Verbanc | 525/380 |
| 3,104,235 | 9/1963 | Kuntz et al. | 525/332.3 |
| 3,163,626 | 12/1964 | Minckler et al. | 525/332.3 |
| 3,397,174 | 8/1968 | Parker et al. | 525/332.3 |
| 3,428,596 | 2/1969 | Strand et al. | |
| 3,919,143 | 11/1975 | Morris | 525/332.3 |
| 3,998,994 | 12/1976 | DeCroix et al. | |
| 4,147,740 | 4/1979 | Swiger et al. | |
| 4,172,859 | 10/1979 | Epstein | |
| 4,174,358 | 11/1979 | Epstein | |
| 4,202,952 | 5/1980 | Onizawa | 525/380 |
| 4,256,857 | 3/1981 | Buckler et al. | |
| 4,355,139 | 10/1982 | Coran et al. | |
| 4,440,911 | 4/1984 | Inoue et al. | |
| 4,728,692 | 3/1988 | Sezaki et al. | |
| 4,810,752 | 3/1989 | Bayan | |

OTHER PUBLICATIONS

Rubber Technology, 2nd Edition, 1973, pp. 262–265, edited by M. Morton.

*Primary Examiner*—Carman J. Seccuro
*Attorney, Agent, or Firm*—Stevens, Davis, Miller & Mosher

[57] ABSTRACT

Functionalized thermoplastics such as styrene-maleic anhydride copolymers polystyrene or maleated polyolefins may be thoughened with halogenated rubbers which are copolymers of isoprene and isobutylene provided a dialkyl or dihydroxyalkyl amino alkanol is present as a compatibilizer. The toughened thermoplastics have about a two fold increase in IZOD impact resistance.

1 Claim, No Drawings

TOUGHENED THERMOPLASTICS

This is a division of application Ser. No. 340,284 filed Apr. 19, 1989, now U.S. Pat. No. 4,921,910.

FIELD OF THE INVENTION

The present invention relates to toughened thermoplastics. More particularly, the present invention relates to polyolefins and styrenic polymers which contain anhydrides of carboxylic acid which are toughened with an halogenated butyl rubber. The thermoplastic blend also contains a tertiary amine alcohol.

BACKGROUND OF THE INVENTION

Thermoplastics have a wide variety of uses. This is generally due to their processing ease, making it possible to mold difficult or intricate shapes fairly easily. Unfortunately some thermoplastics tend to be brittle. Thus, they tend to break on impact. One of the methods to improve the toughness of thermoplastics is to incorporate therein small amounts of a dispersed rubbery phase. This has resulted in materials such as high impact polystyrene (HIPS). This type of tough polymer may be prepared by grafting a thermoplastic onto a rubbery polymer during polymerization of the thermoplastic. Such procedures are well known to those skilled in the art.

It is also possible in some circumstances to physically blend thermoplastics and impact modifiers. Representative of such blending art are U.S. Pat. Nos. 4,172,859 and 4,174,358 to Epstein. However, if the rubbery phase is not compatible with the thermoplastic, there will not be an enhancement of the properties of the thermoplastic, in fact, the impact properties may likely decrease.

It is known that tertiary amines will react with halogens to produce a quaternary amine. U.S. Pat. No. 4,355,139 issued Oct. 19, 1982 to Coran et al assigned to Monsanto discloses a compatibilizing blend of a functionalized poly alpha olefin and an amine modified nitrile rubber. The disclosure of the Coran patent illustrates a tertiary amine linkage et Col. 3. The chlorine from the olefin reacts with an amine in the nitrile rubber. This does not suggest the butyl rubber impact modifiers of the present invention.

It is known that halobutyl rubber in admixture with amine containing compounds has good "green" strength. This is disclosed in U.S. Pat. No. 4,256,857 issued Mar. 17, 1981 to Buckler et al, assigned to Polysar Limited. The Buckler patent does not suggest that such halobutyl rubber could be used as a toughening agent for thermoplastics.

The present invention seeks to provide novel compositions of thermoplastics toughened with halogenated butyl rubber.

SUMMARY OF THE INVENTION

The present invention provides a polymeric blend comprising:

A) per 100 parts by weight of a polymer selected from the group consisting of:
  i) $C_{2-3}$ poly alpha olefins which have been grafted with from 0.1 to 10 weight percent of a $C_{4-8}$ anhydride of a dicarboxylic acid; and
  ii) polymers comprising:
    a) from 50 to 99 weight percent of one or more $C_{8-12}$ vinyl aromatic monomers which are unsubstituted or substituted by a chlorine atom or a $C_{1-4}$ alkyl radical;
    b) from 1 to 20 weight percent of one or more anhydrides of a $C_{4-8}$ dicarboxylic acid; and
    c) optionally up to 15 weight percent of one or more $C_{1-8}$ alkyl esters of a $C_{3-6}$ ethylenically unsaturated carboxylic acid;

B) from 20 to 80 parts by weight of a copolymer of isoprene and isobutylene in a molar ratio of 1:99 to 3:97, which polymer has been halogenated with from 0.5 to 3 weight percent of chlorine or bromine; and C) from 0.5 to 1.5 parts by weight of one or more compatibilizing agents selected from the group consisting of:
  i) $C_{2-10}$ aminoalkanols which are substituted at the nitrogen atom by two radicals selected from the group consisting of $C_{1-4}$ alkyl and hydroxyalkyl radicals;
  ii) $C_{6-10}$ aromatic ethers of $C_{2-10}$ aminoalkanols which are substituted at the nitrogen atom by two radicals selected from the group consisting of $C_{1-4}$ alkyl and hydroxyalkyl radicals;
  iii) $C_{4-10}$ aminoalkenols which are substituted at the nitrogen atom by two radicals selected from the group consisting of $C_{1-4}$ alkyl and hydroxyalkyl radicals provided that the ethylenic unsaturation is not adjacent the nitrogen atom or a hydroxyl radical; and
  iv) $C_{6-10}$ aromatic ethers of $C_{4-10}$ aminoalkenols which are substituted at the nitrogen atom by two radicals selected from the group consisting of $C_{1-4}$ alkyl and hydroxyalkyl radicals provided that the ethylenic unsaturation is not adjacent the nitrogen atom or a hydroxyl radical.

The present invention also provides a method for preparing the above toughened thermoplastics which comprises high shear mixing a melt of components A as described above with a masterbatch of components B and C as described above. Preferably, components B and C as described above are provided as a masterbatch and mixed under high shear with component A.

The present invention also provides a masterbatch comprising 20 to 80 parts by weight of component B as described above and 0.5 to 1.5 parts by weight of component C as described above.

DETAILED DESCRIPTION

The thermoplastic materials useful in accordance with the present invention are generally polyolefins or styrene based thermoplastics which contain an anhydride of a $C_{4-8}$ dicarboxylic acid.

Typically, the polyolefins are polyethylene or polypropylene which have been grafted with from 0.1 to 10, preferably 0.1 to 5, more preferably 0.1 to 3 weight percent of maleic anhydride. The processes for such grafting are well known. A representative process is disclosed U.S. Pat. No. 4,147,740 issued Apr. 3, 1979 to General Electric. Preferably, the polyolefin contains from 0.1 to 5, most preferably 0.1 to 3 weight percent of maleic anhydride.

The styrenic type polymers comprise:
from 50 to 99 weight percent of one or more $C_{8-12}$ vinyl aromatic monomers which are unsubstituted or substituted by a chlorine atom or a $C_{1-4}$ alkyl radical;
from 1 to 20 weight percent of one or more $C_{4-8}$ anhydrides of a dicarboxylic acid and optionally up to 15 weight percent of one or more $C_{1-8}$ alkyl esters of a $C_{3-6}$ ethylenically unsaturated carboxylic acid.

Useful vinyl aromatic monomers include styrene, alpha methyl styrene, and para methyl styrene. Useful anhydrides include maleic anhydride. Useful alkyl esters include methyl methacrylate, ethyl methacrylate, methyl acrylate ethyl acrylate, butyl methacrylate, butyl acrylate and their homologues of higher acids (such as itaconic and fumaric acid).

If the alkyl esters are not present in the styrenic type polymer, a preferred composition comprises from 80 to 99 weight percent of one or more of said vinyl aromatic monomers and from 1 to 20 weight percent of one or more of said $C_{4-8}$ anhydrides of a dicarboxylic acid.

If the alkyl ester is present in the styrenic type thermoplastic, a preferred composition comprises from 65 to 96 weight percent of one or more of said vinyl aromatic monomers; from 1 to 20 weight percent of one or more of said $C_{4-8}$ anhydride of a dicarboxylic acid; and from 3 to 15 weight percent of one or more of said alkyl esters.

The halogenated butyl rubber (or halobutyl rubber) useful in accordance with the present invention comprises a copolymer of isoprene and isobutylene in a molar ratio of 1:99 to 3:97. Generally, the polymers will have a molecular weight (determined by viscosity) of from about 350,000 to about 450,000. The polymer is halogenated in a hydrocarbon solvent and may contain from 0.5 to 3 weight percent of halogen. Typically brominated butyl rubber contains from about 1.0 to 2.5 most preferably 1.5 to 2.2 weight percent bromine. Typically chlorinated butyl rubber contains from about 1.0 to about 1.5 weight percent chlorine. These polymers are commercially available and are discussed in the literature. A useful text discussing butyl and halobutyl rubbers is Rubber Technology Second Edition, edited by Maurice Morton, Van Nostrand Reinhold Company, 1973, New York, N.Y.

The third component in the compositions of the present invention may be characterized as a dialkyl or dihydroxy alkyl amino alkanol. The compounds may be characterized by the formula:

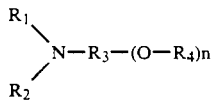

wherein $R_1$ and $R_2$ are $C_{1-4}$, preferably $C_{1-2}$, alkyl or hydroxy alkyl radicals.

$R_3$ is a $C_{2-10}$ alkanol radical or a $C_{4-10}$ hydroxy alkenyl radical provided the double bond is not adjacent the nitrogen atom or the hydroxyl group.

$R_4$ is a $C_{6-10}$ aromatic radical, preferably a phenyl radical, and n is either 0 or 1.

Preferred tertiary amino alkanols include dimethyl aminoethanol, diethyl aminoethanol, dimethyl amino propanol, diethyl aminopropanol, dimethyl aminobutanol, diethyl aminobutanol, dimethyl aminopentanol, and diethyl aminopentanol.

If a phenyl ether is used, preferably it has the formula:

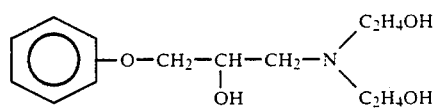

N,N-diethanol-amino-propan-2-ol phenyl ether or

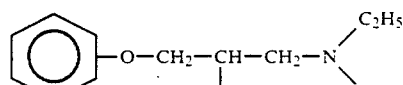

N,N-diethyl-amino-propan-2-ol phenyl ether

There are several options in preparing the compositions of the present invention. The compositions may be prepared in an intensive mixer or the compounds may be prepared in an extruder provided there is sufficient time to permit the reactions between the anhydride of the thermoplastic, the hydroxyl group on the amine and the halide of the rubber with the amine.

In each of these options there are two further options. The ingredients may be fed directly to the high shear mixer or the extruder. In some instances, however, the amine may be volatile at the melting temperature of the thermoplastic. In these instances a master batch of rubber and amine is prepared. The master batch of rubber and amine is then fed to an intensive mixer or extruder together with the thermoplastic.

If a master batch is prepared, the halobutyl rubber and the amine are blended in a high shear mixer at a temperature up to about 90° C., preferably from room temperature up to about 70° C. The resulting masterbatch maybe suitably comminuted. It should be noted that the masterbatch is a butyl rubber having a high green strength.

To prepare the product of the present invention the thermoplastic, the halobutyl rubber and the amine (or master batch) are mixed using a high shear mixer having a suitable heating means or an extruder. Plastic polystyrene based compounds, should be heated to from about 190° to 220°, preferably 200° to 220° C. For the polyolefins the temperature should be from 120° up to 220° C. preferably from about 200° to 220° C.

There are a number of suitable high shear mixers available with suitable heating devices including Banbury mixers, Haake mixers and Brabender mixers.

There are a number of extruders which may be used. If a single screw extruder is used, the screw may have a length to diameter ratio from 12:1 to 35:1 typically 16:1 to 30:1. The rotational speed of the extruder may be from 100 to 200 r.p.m.

The toughened thermoplastics of the present invention may, if desired, be further compounded with typical fillers, adjuvents, release agents, antioxidants, antistatic agents, pigments and the like. The amounts and use of such agents in plastic compounds is well known to those skilled in the art. Additionally, the toughened thermoplastics may be compounded with up to 100 parts by weight, per 100 parts by weight of functionalized polystyrene or polyolefin, of a compatible thermoplastic such as polystyrene or a polyolefin, respectively. In some cases the blends of the present invention may have dark colours which may be lightened by incorporating an antioxidant.

The present invention will be illustrated by the following examples in which parts are by weight (e.g. grams), and temperatures are in °C.

EXAMPLE 1

A phenyl ether tertiary amine was prepared as follows. One equivalent of diethanol amine (105 g) was dissolved in isopropanol and the mixture was heated to reflux (88° C.). Drop wise, one equivalent of phenyl glycidyl ether (150 g) was added to the refluxing mixture. After the completion of the addition of the phenyl glycidyl ether the reaction mixture was refluxed for two hours at 88° C. Upon completion of the reaction the solvent was removed by heating under vacuum. The resulting product is believed to have the following structure.

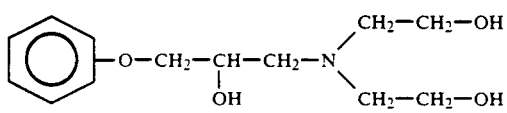

For convenience the product will be referred to as Q1.

EXAMPLE 2

A series of toughened polystyrene based materials were prepared. The following procedure was used. A sample of styrene maleic anhydride copolymer containing about 10 weight percent maleic anhydride sold under the trademark DYLARK was introduced into the mixing chamber of a Haake mixer. The mixing chamber was at a temperature of 200° C. The DYLARK was mixed for 30 seconds at 50 rpm. A specified amount of bromobutyl rubber having about 2.1% bromination and the tertiary amine were then introduced into the mixing chamber and mixed for 3 minutes. The resulting product was then removed and compression molded at 200° C. into test samples. The IZOD impact of the samples was determined using ASTM procedure D-256.

The tertiary amines used were Q1 from Example 1 and dimethylaminoethanol hereinafter DMAE. The amounts of bromobutyl rubber and tertiary amine and the results of the test are set forth in Table 1.

TABLE 1

|  | Control A | Control B | 1 | 2 |
|---|---|---|---|---|
| Styrene maleic anhydride copolymer | 40 | 40 | 40 | 40 |
| Bromobutyl rubber | 0 | 10 | 10 | 10 |
| Amine |  |  |  |  |
| Type |  |  | DMAE | Q1 |
| Amount | 0 | 0 | 0.2 | 0.5 |
| Notched IZOD Ft. lb./ins. | 0.4 | 0.3 | 1.0 | 1.0 |

The results of Table 1 show about a 2.5 fold increase in notched IZOD impact for samples prepared in accordance with the present invention over the controls.

EXAMPLE 3

Bromobutyl rubber was mixed with polypropylene grafted with maleic anhydride (sold by Hercules as PC 072) under conditions as in Example 2. In some of the samples 0.5 g of an antioxidant (Irganox 1010) was also incorporated into the sample. The product was molded and tested as in Example 2. The results are set forth in Table 2.

TABLE 2

|  | Control A | Control B | 1 | 2 | 3 | 4 |
|---|---|---|---|---|---|---|
| Grafted Polypropylene | 50 | 40 | 40 | 40 | 45 | 30 |
| Bromobutyl | 0 | 10 | 10 | 10 | 5 | 20 |
| Amine |  |  |  |  |  |  |
| Type | — | — | DMAE | Q1 | DMAE | DMAE |
| Amount | 0 | 0 | 0.2 | 0.5 | 0.1 | 0.2 |
| Notched IZOD without antioxidant | 0.2 | 0.5 | 0.7 | 1.0 | 0.5 | 8.1* |
| Notched IZOD with antioxidant | 0.2 | 0.6 | 1.2 | 1.0 | — | — |
| Color - without antioxidant | W | DB | DB | Y | PY | B |
| Color - with antioxidant | W | B | PY | Y | — | — |

*Did not break.
W = White
B = Brown
DB = Dark Brown
Y = Yellow
PY = Pale Yellow

Run 3 shows that there should be not less than about 20 parts of butyl rubber per 100 parts of thermoplastic. Run 1 shows that the amine should be present in an amount of at least 0.5 parts by weight per 100 parts by weight of thermoplastic.

EXAMPLE 4

A master batch was prepared by mixing 50 g. of bromobutyl rubber, 1.2 g, of DMAE and 0.5 g. of antioxidant of Example 3 using a Haake mixer at 70° C. for 5 minutes at 70 rpm. 10 g. of the resulting master batch was mixed with 40 g. of styrene maleic anhydride copolymer containing about 10 weight percent maleic anhydride (DYLARK 238) and 0.4 g. of antioxidant of Example 3 using a Haake mixer at 200° C. for 6 minutes at 70 rpm. The resulting product was tested in accordance with Examples 2 and 3. The notched IZOD impact was 0.83 ft./lb./inch. The molded samples were a pale beige. The control values are shown in Table 1.

We claim:

1. A masterbatch consisting essentially of 20 to 80 parts by weight a copolymer of isoprene and isobutylene in a molar ratio of 1:99 to 3:97, which polymer has been halogenated with from 0.5 to 3 weight percent of chlorine or bromine; and from 0.5 to 1.5 parts by weight of one or more compatibilizing agents of the formula:

$$\begin{array}{c} R_1 \\ \phantom{R_1}\diagdown \\ \phantom{R_1R_1}N-R_3-(O-R_4)_n \\ \phantom{R_1}\diagup \\ R_2 \end{array} \quad I$$

wherein $R_1$ and $R_2$ are $C_{1-4}$ alkyl or hydroxy alkyl radicals; $R_3$ is a $C_{2-10}$ alkanol radical or a $C_{4-10}$ hydroxy alkenyl radical provided the double bond is not adjacent the nitrogen atom or the hydroxyl group; $R_4$ is a $C_{6-10}$ aromatic radical; and n is 0 or 1.

* * * * *